United States Patent [19]

Gopalakrishnan et al.

[11] E Re. 31,259

[45] Reissued May 31, 1983

[54] TWO-STAGE TURBO COMPRESSOR

[75] Inventors: Sankaraiyer Gopalakrishnan, Brea, Calif.; William L. Kuivinen, Mount Prospect, Ill.

[73] Assignee: Borg-Warner Corporation, Chicago, Ill.

[21] Appl. No.: 303,647

[22] Filed: Sep. 18, 1981

Related U.S. Patent Documents

Reissue of:

[64] Patent No.: 4,231,702
Issued: Nov. 4, 1980
Appl. No.: 69,424
Filed: Aug. 24, 1979

[51] Int. Cl.[3] ..... F01D 1/12

[52] U.S. Cl. ..... 415/56; 415/143; 415/DIG. 7

[58] Field of Search ..... 415/56, 52, 53 T, 57, 415/58, 59, 74, 83, 143, 120, 201, DIG. 7, 53 R, DIG. 1

[56] References Cited

U.S. PATENT DOCUMENTS

| | | | |
|---|---|---|---|
| 3,303,993 | 2/1967 | Andrews et al. | 417/355 |
| 3,751,178 | 8/1973 | Paugh et al. | 415/56 |
| 3,941,499 | 3/1976 | Kronogard | 415/120 X |

FOREIGN PATENT DOCUMENTS

| | | |
|---|---|---|
| 345856 | 12/1921 | Fed. Rep. of Germany . |
| 2115330 | 3/1971 | Fed. Rep. of Germany . |

*Primary Examiner*—Philip R. Coe
*Attorney, Agent, or Firm*—Aubrey L. Burgess

[57] ABSTRACT

A two stage compressor and the like which comprises first and second stage impellers, an inlet to and an outlet from each impeller stage, a crossover passage means from the first outlet to the second inlet located crossing the first inlet, adjustable guide vanes in the first inlet and fixed de-swirl vanes in the first outlet, the inlet to the second stage impeller being located radially inwardly to that of the first stage impeller.

3 Claims, 3 Drawing Figures

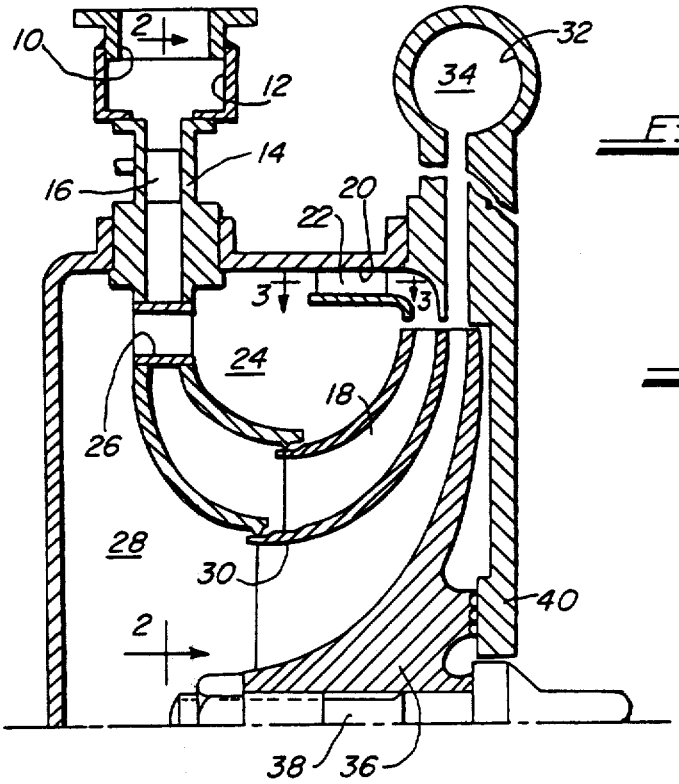
FIG. 1
FIG. 3
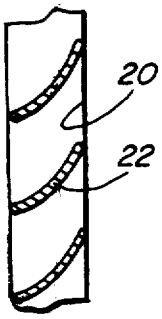
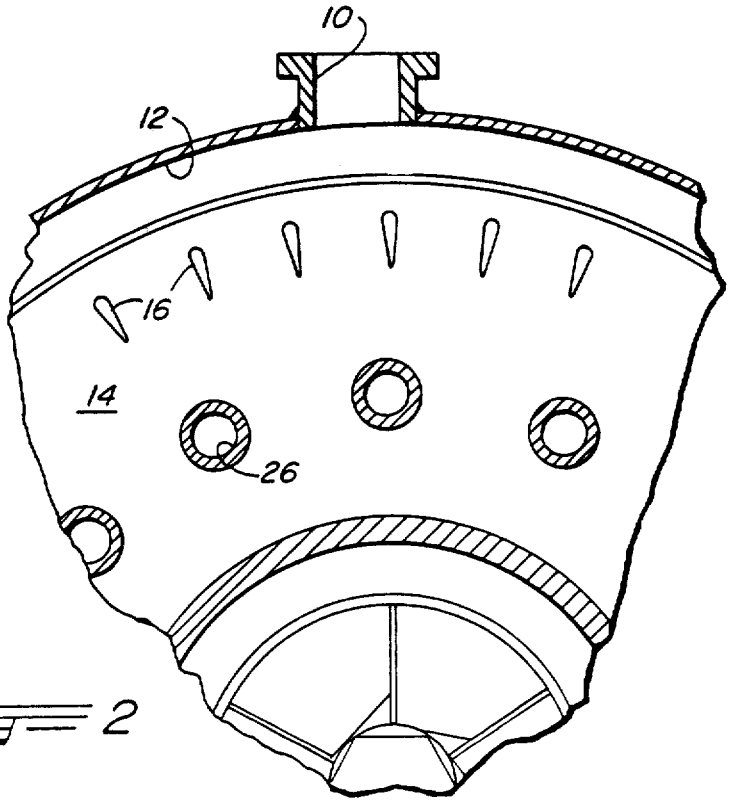
FIG. 2

TWO-STAGE TURBO COMPRESSOR

Matter enclosed in heavy brackets [ ] appears in the original patent but forms no part of this reissue specification; matter printed in italics indicates the additions made by reissue.

BACKGROUND OF THE INVENTION

Two stage compressors are well known in the art. Generally they comprise tandem units of relatively long axial length requiring a long shaft and possibly extra bearings. Such units require considerable space to properly function.

THE INVENTION

This invention relates to a compact two stage centrifugal compressor and the like in which the overall axial length is equivalent to a single stage compressor as known in the art and in which fluid is introduced at a location radially outwardly of the longitudinal axis of the compressor to the inlet of a first centrifugal impeller from which the fluid is discharged through an outlet having de-swirl vanes, through cross-over passages or ducts in the first inlet and to the inlet of the second stage centrifugal impeller, the latter inlet being radially inwardly of the first inlet. Fluid is discharged from the second stage impeller. The impellers are joined for concurrent rotation and are so constructed to have a common dividing wall.

THE DRAWINGS

FIG. 1 is a partial sectional view of a compressor according to this invention;

FIG. 2 is a partial sectional view taken on line 2—2 of FIG. 1; and

FIG. 3 is a view taken on line 3—3 of FIG. 1.

DETAILED DESCRIPTION

The compressor illustrated in the drawings comprises an inlet 10 for the passage of fluid to a circular inlet distributor 12 and then to an inlet passage structure 14 in which are located a plurality of adjustable inlet guide vanes 16 having a streamlined cross section (as illustrated in FIG. 2) which direct the fluid in a generally radial direction to a first stage centrifugal impeller 18. Fluid is discharged from the first stage impeller at a location radially outwardly from its inlet and into a circular discharge annulus 20 in which are located a plurality of fixed de-swirl vanes 22. The fluid flows through a discharge or outlet chamber 24 and through radially arranged cross-over passages 26 into an inlet chamber 28 for the second stage impeller 30 for discharge into a circular diffuser 32 and then to a discharge 34.

The first and second stage impellers 18 and 30, respectively, are parts of a centrifugal rotor 36 keyed to a shaft 38 connected to a source of rotary motion, such as a motor and the like. The rotor is housed in a multi-part housing 40 having walls which define parts of the discharge chamber 24, the inlet chamber 28 and the diffuser 32. The impellers 18 and 30 can be manufactured as an integral piece or as separate parts suitably joined.

It will be noted that the inlet to the first stage impeller 18 is located radially outwardly of the inlet to the second stage impeller 30 and that the cross-over passages pass through the inlet passage structure 14. This placement is in a low velocity and low pressure region and results in negligibly small losses in velocity and pressure.

Because the inlet guide vanes 16 are located at a large diameter area, the vanes are more effective to direct the inlet of fluid to the impeller 18 than they would be at other locations in other arrangements; such as taught by the prior art.

We claim:

[1. In a two stage rotary compressor having first and second stage centrifugal impellers connected to a rotatable shaft, inlets to and outlets from each stage and with the inlet to the second stage being connected to the discharge from the first stage and with the outlets from each stage being located at the same radial distance from the shaft, the improvement which comprises: the inlet to said second stage impeller being located radially inwardly of the inlet to the first stage impeller.]

[2. In a two stage compressor as recited in claim 1, further comprising a plurality of fixed de-swirl vanes in said outlet of said first stage.]

[3. In a two stage compressor as recited in claims 1 or 2 further comprising adjustable inlet guide vanes in said inlet to the first stage impeller.]

[4. In a two stage compressor as recited in claim 1 further comprising cross-over passages in said inlet to the first stage impeller forming said connections between the outlet of the first stage impeller and the inlet of the second stage impeller.]

5. In a two stage compressor as recited in claim [1] *7* in which said first and second impellers are joined for concurrent rotation and have a common wall therebetween.

6. In a two stage compressor as recited in claim 5 in which said first and second impellers are integral.

*7. In a two stage rotary compressor having first and second stage centrifugal impellers connected to a rotatable shaft, an inlet to each impeller stage and an outlet from each impeller stage and with the inlet to the second stage being connected to the outlet of the first stage and with the outlets from each stage being located at the same radial distance from the shaft, the inlet to the second stage impeller being located radially inwardly of the inlet to the first stage impeller, the improvement comprising: a plurality of fixed de-swirl vanes in the outlet of the first stage impeller; adjustable inlet guide vanes in said inlet to the first stage impeller; and cross over passages in said inlet to the first stage impeller forming said connections between the outlet of the first stage impeller and the inlet to the second stage impeller.*

* * * * *